United States Patent
Gil et al.

(10) Patent No.: US 7,563,417 B2
(45) Date of Patent: Jul. 21, 2009

(54) THIN MICRO REFORMING APPARATUS WITH PERIPHERY INFLOW CHANNEL

(75) Inventors: Jae Hyoung Gil, Seoul (KR); Ro Woon Lee, Seoul (KR); Sung Han Kim, Kyungki-do (KR); Jae Hyuk Jang, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 20 days.

(21) Appl. No.: 11/527,421

(22) Filed: Sep. 27, 2006

(65) Prior Publication Data
US 2007/0071659 A1    Mar. 29, 2007

(30) Foreign Application Priority Data
Sep. 29, 2005 (KR) .................. 10-2005-0091321

(51) Int. Cl.
*B01J 10/00* (2006.01)
*B01J 8/04* (2006.01)

(52) U.S. Cl. .................. 422/189; 422/198; 48/61

(58) Field of Classification Search .............. 422/189, 422/198
See application file for complete search history.

(56) References Cited

U.S. PATENT DOCUMENTS

| | | | |
|---|---|---|---|
| 6,200,536 B1 | 3/2001 | Tonkovich et al. | |
| 2004/0244290 A1* | 12/2004 | Yamamoto et al. | 48/127.9 |
| 2005/0046007 A1* | 3/2005 | Nakamura et al. | 257/686 |
| 2005/0284022 A1* | 12/2005 | Lim | 48/61 |
| 2007/0044380 A1 | 3/2007 | Hwang et al. | |

FOREIGN PATENT DOCUMENTS

| | | |
|---|---|---|
| DE | 10 2006 031 480 A1 | 3/2007 |
| EP | 0991465 | 4/2000 |
| JP | 2004-288573 A | 10/2004 |
| KR | 10-2004-0069193 | 8/2004 |
| WO | WO 99/00186 | 1/1999 |

OTHER PUBLICATIONS

German Office Action issued in German Patent Application No. DE 10 2006 045 361.1, mailed Nov. 28, 2008.

* cited by examiner

*Primary Examiner*—Alexa D Neckel
*Assistant Examiner*—Imran Akram
(74) *Attorney, Agent, or Firm*—McDermott Will & Emery LLP (57) ABSTRACT

The invention relates to a thin micro reforming apparatus used in a fuel cell system. The reforming apparatus includes a substrate having a flow path formed therein, and a fuel inlet portion for introducing fuel to the flow path of the substrate. The fuel inlet portion allows the fuel to flow through a predetermined length of a channel, thereby preheating the fuel. The reforming apparatus also includes an evaporator having a flow path for gasifying liquid fuel, and a reformer for reforming fuel into hydrogen gas via heat absorption reaction. The reforming apparatus further includes a CO remover for removing CO gas contained in the hydrogen gas via heat generation reaction, and a cover for sealing the flow paths of the substrate. The channel of the fuel inlet portion surrounds the evaporator, reformer and CO remover, thereby facilitating insulation at the sides of the reforming apparatus and increasing heat efficiency.

7 Claims, 7 Drawing Sheets

Prior art

Prior art

THIN MICRO REFORMING APPARATUS WITH PERIPHERY INFLOW CHANNEL

CLAIM OF PRIORITY

This application claims the benefit of Korean Patent Application No. 2005-91321 filed on Sep. 29, 2005, in the Korean Intellectual Property Office, the disclosure of which is incorporated herein by reference.

BACKGROUND OF THE INVENTION

1. Field of the Invention

The present invention relates to a thin micro reformer used in a fuel cell system. More particularly, the invention relates to a thin micro reformer which has a channel extended from a fuel inlet portion, along a periphery of a substrate to allow the fuel to flow therethrough to be preheated and enable heat exchange in a reformer and a CO remover, thereby significantly improving heat efficiency and enabling reformation of the fuel and removal of CO in a single sheet of substrate.

2. Description of the Related Art

Recently, there have been increased uses of portable small-sized electronic devices including mobile phones, Personal Digital Assistants (PDAs), digital cameras, notebook computers and the like. In particular, since the launch of Digital Multimedia Broadcasting (DMB) through the mobile phones, the portable small-sized terminals are required to have increased power capacity. Lithium ion secondary batteries used in general to date, which have capacity for two-hour viewing of DMB, are undergoing efforts to improve its capacity, but there have been growing expectations on small-sized fuel cells for a more fundamental solution.

In order to realize such a small-sized fuel cell, either a direct methanol method in which methanol is directly supplied to a fuel electrode or a reformed hydrogen fuel cell (RHFC) method in which hydrogen is extracted from methanol and supplied to a fuel electrode can be adopted. The RHFC method uses hydrogen as fuel as in Polymer Electrode Membrane (PEM) method, thus having advantages in terms of output, power capacity per volume and in that it requires no reactants besides water. However, the method requires a reformer, thus having a disadvantage for miniaturization.

In order for the fuel cell system to obtain high power output density, a reformer is required to convert liquid fuel into gaseous fuel such as hydrogen gas. The reformer includes an evaporating part for gasifying methanol, a reforming part for converting methanol into hydrogen via catalytic reaction at a temperature from 250° C. to 290° C., and a CO removing part for removing CO, a by product. In the reforming part, heat absorption reaction takes place and the temperature should be maintained from 250° C. to 290° C. Also in the CO removing part, the temperature should be maintained at about 170° C. to 200° C. to allow effective reaction.

Figure 1:
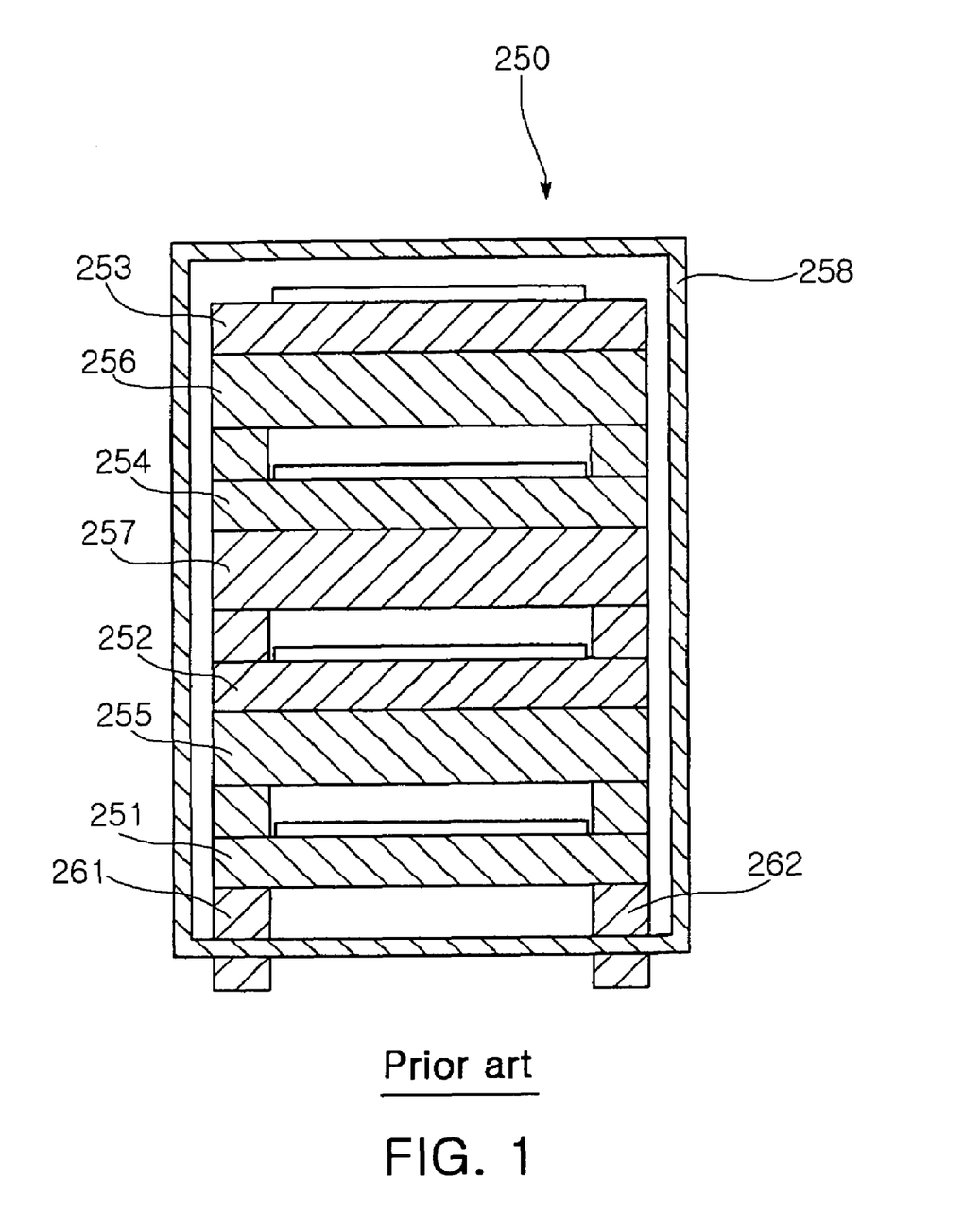
FIG. 1 is a sectional view illustrating a multi-layer reforming apparatus according to the prior art.

As a conventional example, Japanese Patent Application Publication No. 2004-288573 discloses a small-sized reforming apparatus 250 as shown in FIG. 1. Such a conventional small-sized reforming apparatus 250 includes an insulation package 258, and includes a fuel evaporator 251 for combustion, a fuel evaporator 255 for power generation, a first combustor 252, a CO remover 257, a second combustor 254, a reformer 256 and a third combustor 253 which are stacked sequentially in the insulation package 258.

At the bottom of the fuel evaporator 251 for combustion, insulation supporting members 261 and 262 are disposed. These insulation supporting members 261 and 262 support and allow the fuel evaporator 251 for combustion to be disposed apart from an inner wall of the insulation package 258. Such a conventional reforming apparatus has a multilayer structure of at least 10 layers, which makes it difficult to achieve miniaturization.

That is, even if each layer is thin, the overall structure is inevitably thick in its volume and the difficulty in bonding the multiple layers hinders mass-production.

Figure 2:
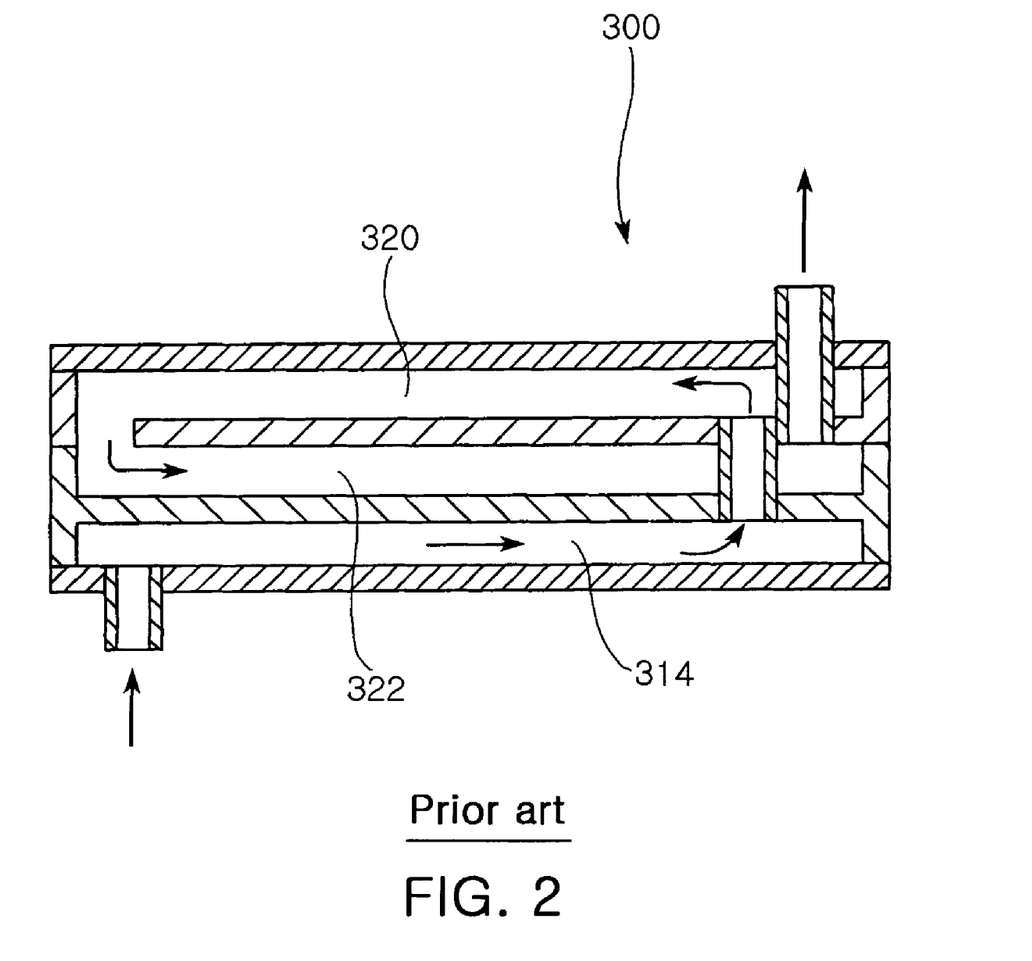
FIG. 2 is a sectional view illustrating another reforming apparatus according to the prior art.

In the meantime, EP No. 0991465 discloses a conventional reformer 300 having multiple layers, which adopts the heat exchange method as shown in FIG. 2. This reformer 300 includes a reaction chamber 320 disposed above a heat exchange chamber 314 with an emission chamber 322 disposed therebetween, thereby forming a stacked structure.

In this reformer 300, the heat is exchanged through multiple layers consisting of the reaction chamber 320, the heat exchange chamber 314 and the emission chamber 322. The reaction chamber 320 provides a channel for heat generation reaction where the heat generated via heat generation reaction is used for heat absorption reaction. The heat exchange member 314 provides a channel where the heat generation is terminated and the heat is exchanged. This method allows heat exchange but increases overall thickness and exhausts fuel, hindering heat efficiency.

Figure 3:
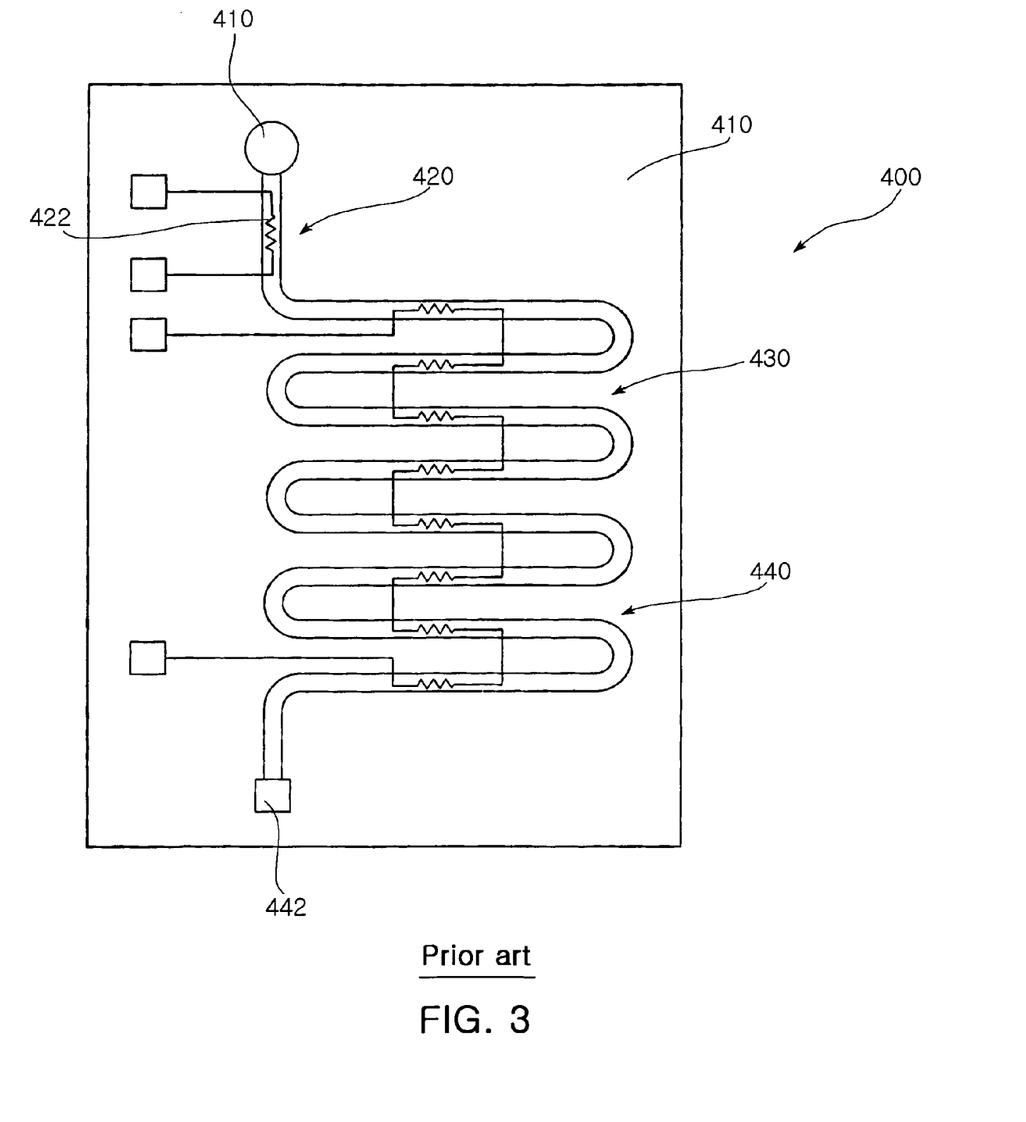
FIG. 3 is a sectional view illustrating further another reforming apparatus according to the prior art.

FIG. 3 illustrates another conventional reformer 400, in which a fuel inlet 410 and a gassifier 420 with a heater 422 are disposed at a side of a substrate 410. Downstream of the fuel inlet 410 and the gassifier 420, a reformer 430 and a CO remover 440 are disposed. Downstream of the CO remover 440, a hydrogen outlet 442 is disposed. Such a conventional reformer, however, uses a heater 422 to heat up the fuel, consuming a great amount of energy.

In addition, the conventional method yields a large volume with difficult manufacturing processes. Further, using a silicon substrate and glass, which has high heat conductivity, the method does not facilitate the optimal reaction temperature distribution which requires at least 250° C. maintained in the reforming part, and 190° C. maintained in the CO removing part.

Therefore, there exists a need in the art for a reformer having a thin structure where fuel is reformed and CO is removed in a single sheet of substrate, improved in capacity with high heat efficiency without consuming much energy.

SUMMARY OF THE INVENTION

The present invention has been made to solve the foregoing problems of the prior art and therefore an object of certain embodiments of the present invention is to provide a thin micro reforming apparatus which allows fuel to absorb heat from a CO remover while passing through a channel of a fuel inlet portion without requiring additional heat supplied to an evaporator, thereby reducing overall heat supply.

Another object of certain embodiments of the invention is to provide a thin micro reforming apparatus which allows liquid fuel to exchange heat while passing through a reformer and a CO remover and enter an evaporator in a pre-heated state, thereby maintaining optimal reaction temperatures at respective parts thereof to significantly improve reaction efficiency.

Further another object of certain embodiments of the invention is to provide a thin micro reforming apparatus which is designed to allow chemical reactions to take place in a single sheet of substrate rather than in multiple layers, and which allows heat exchange among an evaporator, reformer and a CO remover rather than using insulation material between layers, thereby realizing a thin structure reduced in the thickness and advantageous for integration into a fuel cell system without requiring technically difficult bonding of multiple layers.

Yet another object of certain embodiments of the invention is to provide a thin micro reforming apparatus which has a channel of a fuel inlet portion extended along a periphery of a substrate to surround an evaporator, reformer and a CO remover, thereby easily insulating side portions of the substrate.

According to an aspect of the invention for realizing the object, there is provided a thin micro reforming apparatus for a fuel cell system including: a substrate having a flow path formed therein; a fuel inlet portion for introducing fuel to the flow path of the substrate, the fuel inlet portion allowing the fuel to flow through a predetermined length of a channel, thereby preheating the fuel; an evaporator disposed downstream of the fuel inlet portion, the evaporator having a flow path for gasifying liquid fuel; a reformer having a flow path downstream of the evaporator, the reformer for reforming fuel into hydrogen gas via heat absorption reaction; a CO remover having a flow path downstream of the reformer, the CO remover for removing CO gas contained in the hydrogen gas via heat generation reaction; and a cover for covering an upper part of the substrate to seal the flow path of the substrate from external environment, whereby the fuel flowing through the channel is heated.

BRIEF DESCRIPTION OF THE DRAWINGS

The above and other objects, features and other advantages of the present invention will be more clearly understood from the following detailed description taken in conjunction with the accompanying drawings, in which:

FIG. 6($a$) is a longitudinal sectional view illustrating the thin micro reforming apparatus according to the present invention;

FIG. 6($b$) is a longitudinal sectional view of a thin micro reforming apparatus having an insulation material attached according to another embodiment of the present invention.

DETAILED DESCRIPTION OF THE PREFERRED EMBODIMENT

Preferred embodiments of the present invention will now be described in detail with reference to the accompanying drawings.

Figure 4:
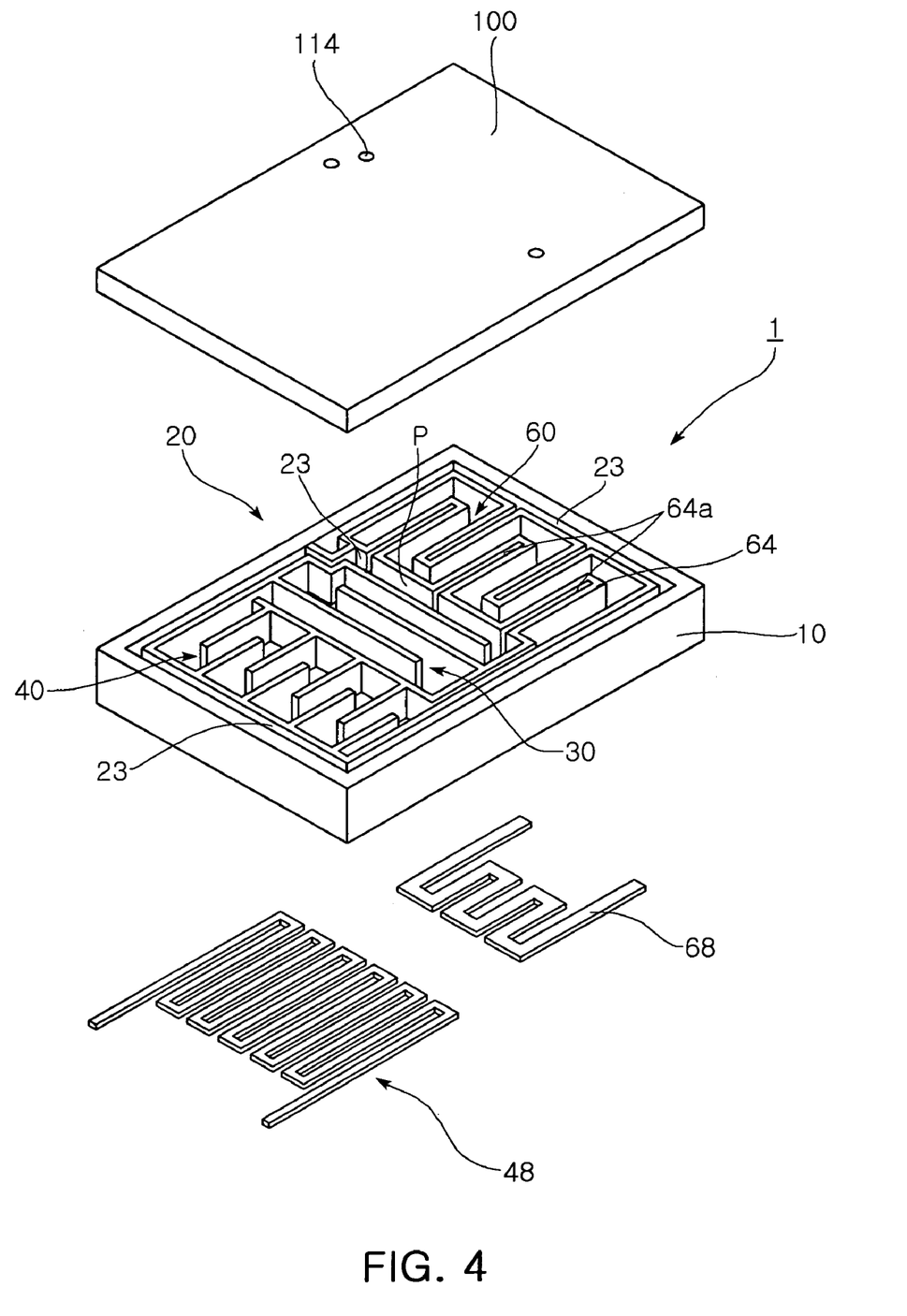
FIG. 4 is an exploded perspective view illustrating a thin micro reforming apparatus according to the present invention.

As shown in FIG. 4, the thin micro reforming apparatus 1 according to a preferred embodiment of the present invention includes a substrate 10 having flow paths formed therein. The substrate 10 may be made of one selected from a group consisting of silicon, metal, glass and heat-resistant plastic.

The substrate 10 has a side thereof etched to have recessed flow paths formed therein by partition walls.

That is, a side of the substrate 10 is etched to be recessed in a desired form of flow paths therein.

Figure 5:
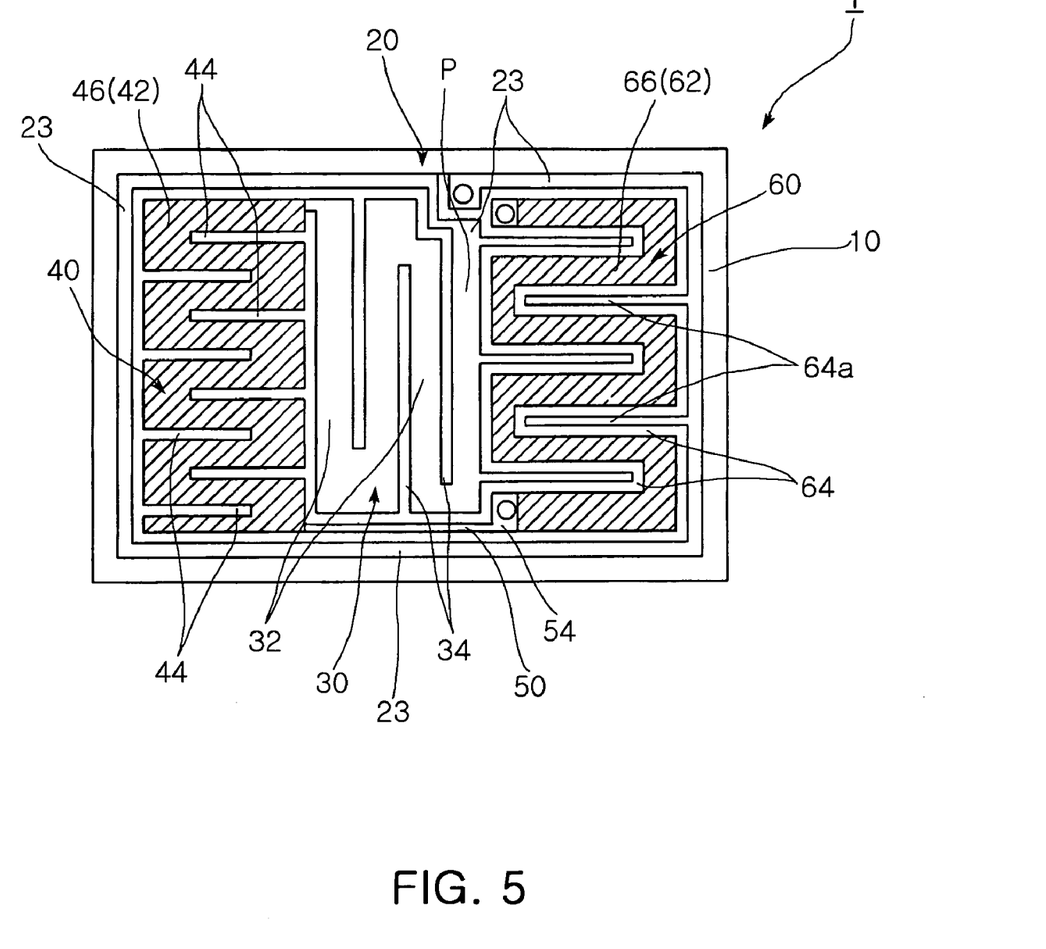
FIG. 5 is a plan view illustrating the thin micro reforming apparatus according to the present invention.

In addition, the substrate 10 has a fuel inlet portion 20 for introducing fuel into the flow paths thereof. As shown in FIGS. 4 and 5, the fuel inlet portion 20 has a structure that allows fuel to flow through a channel which starts from a substantially central portion of the substrate 10 and is extended in a predetermined length, thereby preheating the fuel.

The channel 23 has a form of a narrow flow path extended along an outer periphery of the substrate 10 to surround flow paths of an evaporator 30, a reformer 40 and a CO remover 60 described later.

In addition, the channel 23 includes long slits 64$a$ formed by partition walls 64 of the flowpath 62 of the CO remover 60 described later. The heat from heat generation reaction occurring in the flow path 62 of the CO remover 60 is transmitted through the partition walls 64 to the liquid fuel in an inner space of the long slits 64$a$.

In addition, in order to supply methanol or the liquid fuel, to the fuel inlet portion 20, a cover 100 that is assembled onto an upper part of the substrate 10 has a fuel inlet 110 formed therein.

The fuel inlet portion 20 is eventually connected at the exit side to the evaporator 30 which heats and gasifies the liquid fuel into a gaseous state. The evaporator 30 functions to gasify the fuel in a liquid state to facilitate reforming reaction, and there is no need to form a catalyst on a plurality of partition walls 34 forming the flow path 32 of the evaporator 30.

In addition, the flow path 32 of the evaporator 30 is formed in a zigzag shape by a plurality of partition walls 34 each extended from a side of the fuel inlet portion 20 to the opposed side.

In addition, the reforming apparatus 1 of the present invention includes the reformer 40 having the flow path 42 formed down stream of the evaporator 30. The reformer 40 reforms the fuel into hydrogen gas via heat absorption reaction. The reformer 40 is formed downstream of the evaporator 30, biased toward a side of the substrate 10, and thus the flow path 42 of the reformer 40 is connected to the flow path 32 of the evaporator 30. And the flowpath 42 of the reformer 40 is formed in a zigzag pattern by the partition walls 44 in an opposite direction from the flow path 32 of the evaporator 30.

Thus, the flow path 42 of the reformer 40 is formed in a zigzag shape along a longitudinal direction of the evaporator 30 at a side of the substrate 10 and is defined by the plurality of partition walls 44. Also, the flow path 42 of the reformer 40 has a catalyst 46 formed therein for reforming the liquid fuel into hydrogen gas. The reformer 40 converts the fuel into hydrogen-rich reformed gas via catalytic reaction. The catalyst 46 of the reformer 40 is made of Cu/ZnO or Cu/ZnO/Al$_2$O$_3$, and preferably, can be formed on the partition walls 44 forming the flow path 42 via deposition.

The reformer 40 reforms hydrocarbon-based fuel such as methanol into hydrogen gas via catalytic reaction accompanying heat absorption reaction. A heater 48 formed at a lower part of the substrate 10 provides a heat source needed in this process. The heater 48 reformer 40 is a pattern of electric resistance circuit formed on a lower surface of the substrate 10 for heating the overlying reformer 40 via the substrate 10.

Figure 6:
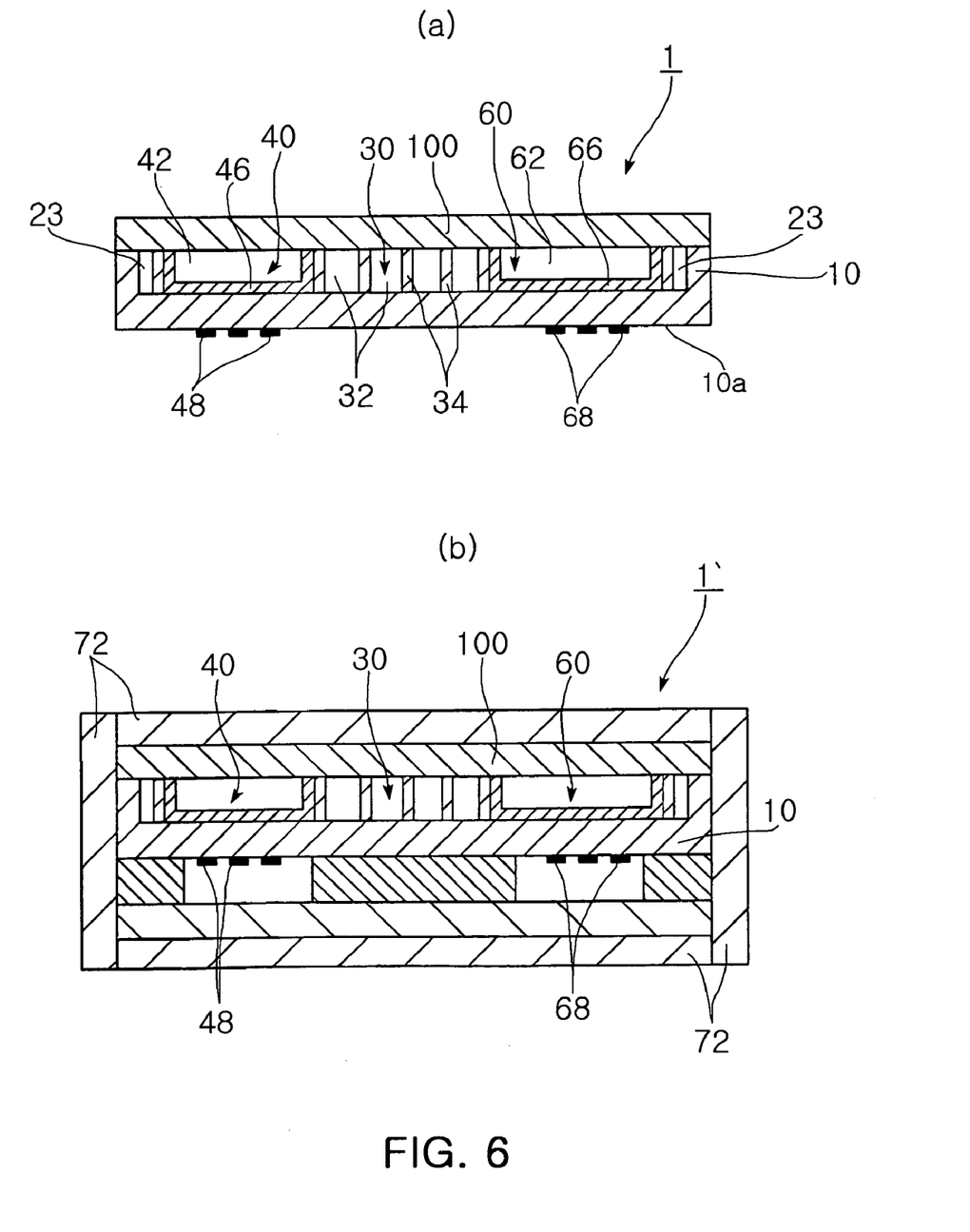

As shown in FIG. 6($a$), the heater 48 reformer 40 is formed at a bottom surface of the substrate 10 to maintain the reformer 40 at a predetermined temperature, preferably, at 250 to 290° C. via the substrate 10.

In addition, the reforming apparatus 1 of the present invention includes the CO remover 60, which has the flow path formed downstream of the reformer 40 and thereby removes CO gas contained in the reformed gas generated from the reformer 40.

The CO remover 60 has the flow path 62 formed at opposed side of the reformer 40 about the evaporator 30 in the center of the substrate 10, and removes CO gas contained in the hydrogen gas via heat generation reaction.

Such a CO remover 60 is supplied with the reformed gas containing hydrogen gas, carbon monoxide and carbon dioxide from the reformer 40, through a narrow connection part 50 having a constricted cross-section. The connection part 50 is extended in parallel to an edge of the substrate 10 and connected to an enlarged flow path portion 54, which has a larger inner area than the connection part 50, provided at an entrance portion of the CO remover 60.

As described above, because the reformed gas including the hydrogen gas, carbon monoxide and carbon dioxide passes through the narrow connection part 50 and flows into the larger area of the enlarged flow path portion 54, the pressure falls down at this particular location. Thus, the gas flows into the CO remover in a low pressure state.

Similar to the evaporator 30 and the reformer 40, the CO remover 60 has the flow path 62 formed by a plurality of partition walls 64. The cover 100 assembled onto the substrate 10 has an air inlet 112 is formed therein corresponding to the position of the entrance portion of the flow path 62, i.e., the enlarged flow path portion 54 of the substrate 10.

The partition walls 64 of the CO remover 60 form long slits 64a in a longitudinal direction of the substrate 10. Since the long slits 64a are in communication with the channel 23 of the fuel inlet portion 20, the liquid fuel flows into the long slits 64a.

In addition, the flow path 62 of the CO remover 60 has a catalyst 66 formed therein for removing CO gas generated from the reformer 40.

In such a CO remover 60, the incoming reformed gas reacts with oxygen and thereby CO is removed. The catalyst 66 of the CO remover 60 is preferably made of one selected from a group consisting of Pt, Pt/Ru and $Cu/CeO/Al_2O_3$.

The CO remover 60 converts CO which is harmful to human body into harmless $CO_2$ via catalytic reaction accompanying heat generation reaction. A heater 68 is formed for the CO remover 60 at a lower part of the substrate 10 to provide a heat source needed in this process.

Figure 7:
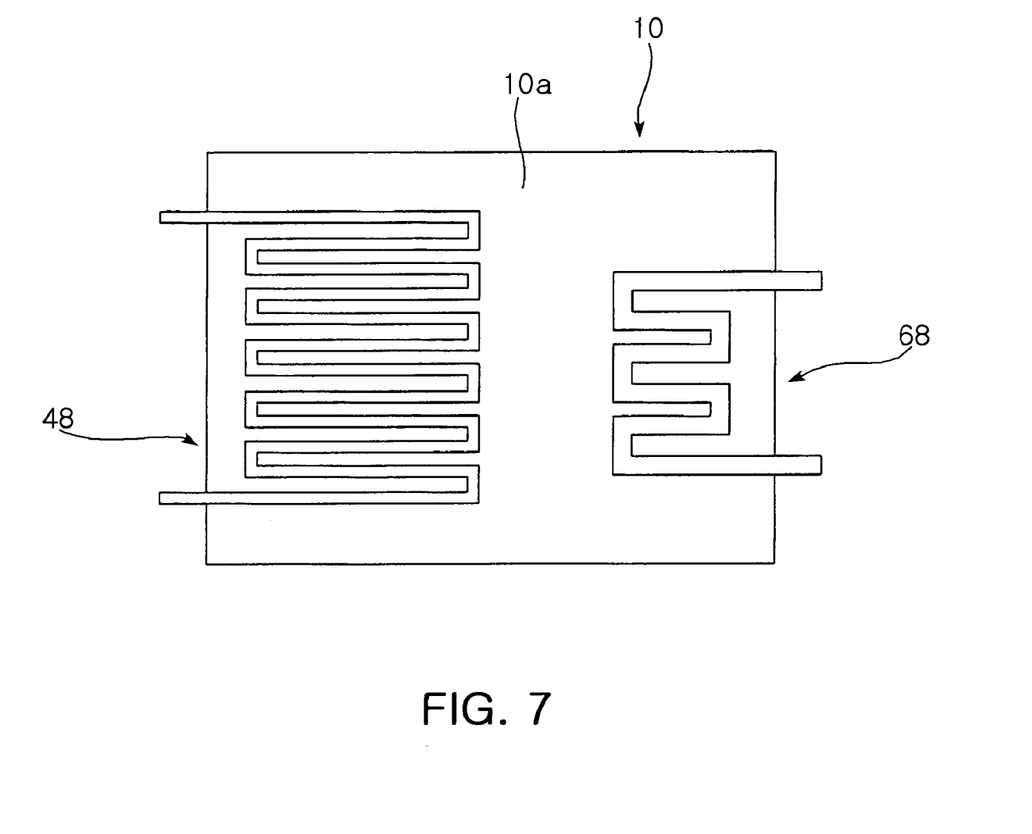
FIG. 7 is a bottom view illustrating a heater provided in the thin micro reforming apparatus in the form of an electric resistance circuit pattern according to the present invention.

As shown in FIGS. 6(a) and 7, the heater 68 0f the CO remover 60 has the form of an electric resistance circuit patterned on a lower surface 10a of the substrate 10, thereby heating the overlying CO remover 60 via the substrate 10.

With appropriate power supply and control, the heater 68 of the CO remover 60 in the form of an electric resistance circuit pattern serves to maintain the CO remover 60 at a predetermined temperature, preferably, at 170° C. to 200° C.

Although the heaters 48 and 68 for heating the reformer 40 and the CO remover 60, respectively, are illustrated as electric resistance circuit patterns formed at a lower part of the substrate 10, the present invention is not limited thereto. Alternatively, as shown in FIG. 6b, there may be heating spaces 48a and 68a provided around the electric resistance circuit patterns 48a and 68a formed at a lower part of the substrate 10. These spaces 48a and 68a are insulated by an insulating material 72 to prevent the heat generated by the heaters 48 and 68 from leaking to the outside and allow the heat to be concentrated in the reformer 40 and the CO remover 60.

In addition, the reforming apparatus 1 of the present invention includes the cover 100 for covering an upper part of the substrate 10 to seal the flow paths or spaces therein from the outside. The cover 100 may be made of the same material, as the substrate 10, selected from a group consisting of silicon, metal, glass, ceramic and heat-resistant plastic, and can be integrated onto an upper surface of the substrate 10 via bonding.

Such a cover 100 may preferably have recessed flow paths (not shown) and spaces formed therein corresponding to the fuel inlet portion 20, the flow paths of the evaporator 30, the reformer 40 and the CO remover 60, thereby further enlarging the inner dimension of the flow path formed by the substrate 10 and the cover 100 assembled together.

The cover 100 integrally adhered to the substrate 10 has a reactive gas outlet 114 formed therein corresponding to an exit portion of the flow path 62 of the CO remover 60. That is, the reactive gas containing hydrogen gas and $CO_2$ generated at the CO remover 60 is emitted to the outside through the reactive gas outlet 114 of the cover 100. Therefore, the cover 100 has the fuel inlet 110 corresponding to the fuel inlet portion 20, the air inlet 112 corresponding to the entrance portion of the CO remover, i.e., the enlarged flow path portion 54, and the reactive gas outlet 114 corresponding to the exit portion of the CO remover 60. This configuration of the cover 100 allows the fuel in the liquid state to be reformed and resultantly emitted as the reactive gas containing hydrogen gas and $CO_2$.

In addition, in the present invention, the insulation material 72 may be attached to outer surfaces of the substrate 10 and the cover 100, thereby effectively sealing the reformer 40 and the CO remover 60 from the external environment, ultimately resulting in a highly heat-efficient reforming apparatus 1'. That is, the insulation material 72 insulates the reforming apparatus 1' of high-temperature from the external environment to decrease externally felt temperature such that the user feels low temperature of about 20° C. to 60° C.

In the thin micro reforming apparatus 1 with the above configuration according to the present invention, the fuel in a liquid state is injected through the fuel inlet 110 of the fuel inlet portion 20, passes through the fuel inlet portion 20, and enters the inner flow path 23 of the assembled substrate 10 and the cover 100. The liquid fuel is supplied at 10 to 100 μm/min via a syringe pump (not shown) provided outside.

The liquid fuel injected through the fuel inlet 110 flows through the channel 23 formed along the outermost periphery of the substrate 10, and in particular, when the fuel reaches the long slits 64a formed by the partition walls 64 of the CO remover 60, it absorbs heat generated form the CO remover 60 and is evaporated.

The fuel is further evaporated as it passes through the outermost periphery of the CO remover 60 and then the reformer 40. During this process, the liquid fuel flowing through the channel 23 has an effect of insulating the CO remover 60 and the reformer 40. After passing through the outermost periphery of the reformer 40, the liquid fuel flows to the central portion of the substrate 10. Then, the fuel is completely evaporated as it passes through a region P next to the flow path of the CO remover 60 while exchanging heat with the CO remover 60. FIG. 5 illustrates the overall path through which the liquid fuel passes through the heat exchanging channel 23 and the completely evaporated fuel gas passes through the evaporator 30 and enters the reformer 40.

More specifically, after passing through the channel of the fuel inlet portion 20, the liquid fuel enters the evaporator 30 and maintains the temperature necessary for reforming, i.e., 250 to 290° C.

Then, the gasified fuel enters the reformer 40 downstream of the evaporator 30 to go through catalytic reaction accompanying heat absorption reaction. During this process, reformed gas containing hydrogen gas, CO and $CO_2$ is generated at a temperature ranging from 250 to 290° C.

The reformed gas generated as described above passes through the connection part 50 having a small cross-section. Specifically, the high-temperature, high-pressure reformed gas passes through the narrow connection part 50, and as it enters the suddenly enlarged area of the enlarged flow path portion 54, its pressure falls down. Thus, the pressure at the enlarged flow path portion 54 is significantly lower than that in the reformer 40.

In addition, the reformed gas passes through the CO remover 60 with air being supplied through the air inlet 112 of the cover 100 positioned corresponding to the enlarged flow path portion 54.

At the enlarged flow path portion, the air necessary for removing CO is supplied via an external pump (not shown) at several mL to 100 mL/min.

Therefore, in the CO remover 60, catalytic reaction of selective oxidation accompanying heat generation reaction takes place at a temperature ranging from 170 to 200° C. to convert CO in the reformed gas to harmless $CO_2$.

Thus, after passage through the CO remover 60, reactive gas containing hydrogen gas and $CO_2$ is generated and emitted to the outside through the reactive gas outlet 114 of the cover 100. According to the present invention set forth above, the fuel inlet portion 20, through which the liquid fuel, methanol is introduced in a room-temperature liquid state, is connected to the channel 23 extended along the periphery of the reformer 40 and the CO remover 60. Thereby, the fuel in the liquid state passing through the channel is heated while absorbing the heat transferred from the reformer 40 at 250 to 290° C. and the heat transferred from the CO remover 60 at 170 to 200° C. Therefore, the evaporator 30 for evaporating the liquid fuel does not require an additional heater to heat the fuel.

Moreover, according to the present invention, the air necessary for oxidation reaction in the CO remover 60 has to be supplied from the outside. Particularly, the pump (not shown) which supplies the air through the air inlet 112 of the cover 100 can have small capacity according to the present invention. That is, as the reformed gas passes through the narrow connection part 50 and enters the enlarged flow path portion 54 of the CO remover 60, the pressure is significantly dropped in the enlarged flow path portion 54 from that in the reformer 40 due to the decreased internal pressure. This allows the ambient air to be easily inhaled into the reforming apparatus through the air inlet 112.

Therefore, the pump (not shown) for supplying the air through the air inlet 112 according to the present invention can have smaller capacity than the conventional one.

In addition, the catalysts 46 and 66 coated in the flow paths 42 and 62 via deposition according to certain embodiments of the invention, which however does not limit the present invention. As an alternative, particle types of catalysts may be filled in the flow paths of the reformer 40 and the CO remover 60 so that the fuel flows through the flow paths in the presence of the particles, in particular, through gaps between the particles.

In addition, the cover 100 adhered to the substrate 10 preferably has spaces and flow paths formed therein corresponding to those of the fuel inlet portion 20, the evaporator 30, the reformer 40 and the CO remover 60, thereby further enlarging the inner area of the flow paths formed by the substrate 10 and the cover 100 assembled together.

Furthermore, it will be apparent to those skilled in the art that the variations of the catalysts or the cover are easily made within the scope of the invention.

According to the present invention as set forth above, the thin micro reforming apparatus allows the fuel to absorb heat of the CO remover while passes through the channel of the fuel inlet portion, and thus there is no need to supply additional heat, reducing the overall heat supply.

In addition, the reforming apparatus is designed such that the chemical reactions take place in a single sheet of substrate rather than in multiple layers and heat is exchanged at the fuel inlet portion, the evaporator, the reformer and the CO remover rather than using insulation material between layers. This allows reduction of the thickness, which is advantageous for integration into a fuel cell system, and does not require technically difficult bonding of multiple layers.

Furthermore, the channel of the fuel inlet portion is extended along the periphery of the substrate to surround the evaporator, the reformer and the CO remover, facilitating the conventionally problematic insulation at the side portions of the substrate.

While the present invention has been shown and described in connection with the preferred embodiments, it will be apparent to those skilled in the art that modifications and variations can be made without departing from the spirit and scope of the invention as defined by the appended claims.

What is claimed is:

1. A thin micro reforming apparatus for a fuel cell system comprising:
    a substrate having a flow path of a single layer structure formed therein;
    a fuel inlet portion for introducing fuel to the flow path of the substrate, the fuel inlet portion allowing the fuel to flow through a predetermined length of an inflow channel, thereby preheating the fuel;
    an evaporator having a portion of the flow path, the evaporator disposed downstream of the fuel inlet portion to gasify liquid fuel;
    a reformer having another portion of the flow path, the reformer disposed downstream of the evaporator to reform fuel into hydrogen gas via heat absorption reaction;
    a CO remover having yet another portion of the flow path, the CO remover disposed downstream of the reformer to remove CO gas contained in the hydrogen gas via heat generation reaction; and
    a cover for covering an upper part of the substrate to seal the flow path of the substrate from external environment, whereby the fuel flowing through the channel is heated,
    wherein the evaporator, the reformer and the CO remover form the single layer structure,
    wherein the inflow channel is configured in the form of a narrow flow path along a periphery of the substrate to surround the flow paths of the evaporator, the reformer and the CO remover,
    wherein the flow path of the CO remover is formed in a zigzag shape by a plurality of partition walls each extended from a side of the substrate to another side of the substrate, and
    wherein the inflow channel includes slits formed by the plurality of partition walls forming the flow path of the CO remover.

2. The thin micro reforming apparatus according to claim 1, wherein the flow path of the evaporator is formed in a zigzag shape by a plurality of partition walls each extended from an edge of the substrate to an opposed edge of the substrate.

3. The thin reformer according to claim 1, wherein the reformer has a heater formed at a bottom surface thereof, the heater maintaining a predetermined temperature in the reformer via the substrate.

4. The thin reformer according to claim 1, wherein the CO remover has a heater formed at a bottom surface thereof, the heater maintaining a predetermined temperature in the CO remover via the substrate.

5. The thin reformer according to claim 1, wherein the cover has a recessed flow path formed corresponding to the flow paths of the fuel inlet portion, the evaporator, the reformer and the CO remover so as to enlarge an inner dimension of the flow paths formed by the substrate and the cover assembled together.

6. The thin micro reforming apparatus according to claim 1, wherein the evaporator is disposed between the reformer and the CO remover.

7. The thin micro reforming apparatus according to claim 1, wherein the fuel inlet portion preheats the fuel by heat supplied from the reformer and the CO remover.

* * * * *